May 24, 1927.

P. G. COLE 1,630,110

SQUASH BALL TESTER

Filed April 30, 1925

INVENTOR :
Philip Gillett Cole,
By Attorneys,
Fraser, Myers & Manley.

Patented May 24, 1927.

1,630,110

UNITED STATES PATENT OFFICE.

PHILIP GILLETT COLE, OF FOREST HILLS, NEW YORK, ASSIGNOR TO A. SCHRADER'S SON, INC., OF BROOKLYN, NEW YORK, A CORPORATION OF NEW YORK.

SQUASH-BALL TESTER.

Application filed April 30, 1925. Serial No. 26,905.

The present invention relates to a device for testing the pressure within an inflated member, and more specifically for determining the pressure within a squash ball or the like.

It is a well recognized fact that the pressure within an inflated member gradually diminishes with time, and this loss in pressure appears to be dependent upon the character of the fluid containing body, and the atmospheric conditions surrounding it. With inflated balls such as are used in the games of squash, lawn tennis and the like, these losses are evidenced by a substantial decrease in the resiliency and liveliness of the balls. Therefore, in order to insure that balls used in such games, especially when played under tournament conditions, are always uniform, new balls, which in the course of manufacture have been inflated to an arbitrary standard pressure, are employed. And to further insure that these balls measure up to the standard pressure, I have conceived the present invention, which is simple in construction and operation, and of a size to be conveniently portable.

According to the present invention I provide a device of the character described, which, in its basic conception, comprises a pair of spaced movable seats adapted to receive therebetween an inflated member, one of said seats being adapted to be moved a predetermined distance toward the other seat to deform said inflated member when positioned between the seats, the second seat having means normally resisting its movement when the inflated member is pressed thereagainst, and a gauge operable by movement of the second seat adapted to register the pressure within the inflated member. The invention also contemplates other features of novelty which will be hereinafter more fully set forth.

Figure 1:
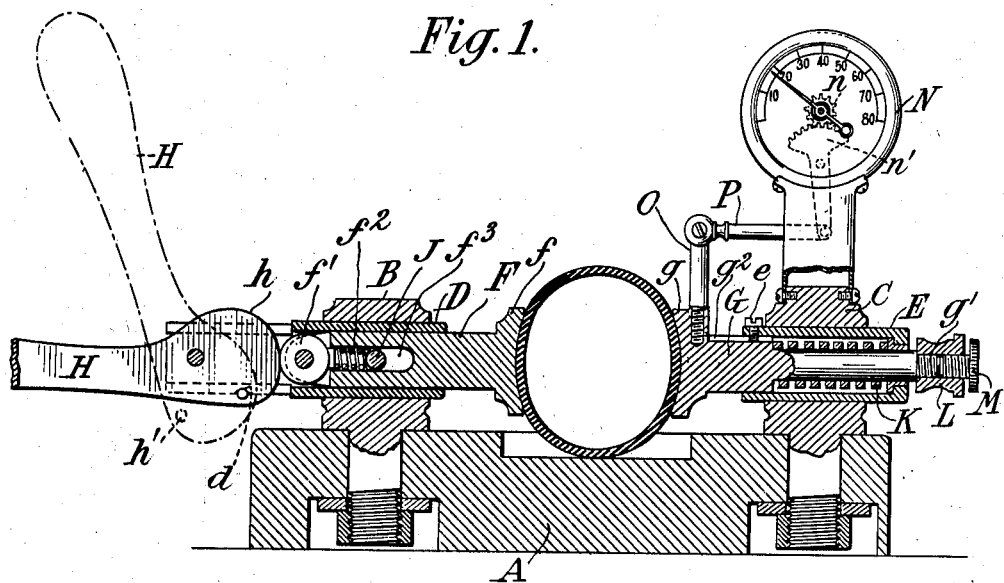
Figure 2:
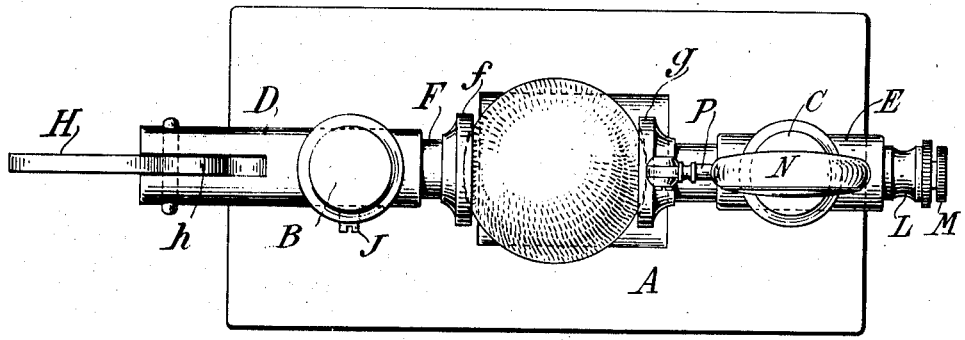

In the accompanying drawings, I have shown a preferred embodiment of my invention wherein, Figure 1 is a longitudinal mid-section of the device taken along the plane of the line 1—1 in Fig. 2 and showing the parts in the position for measuring the pressure within a ball.

Fig. 2 is a top plan view of the device shown in Fig. 1.

Referring to the drawings, let A indicate the base member of the device upon which are mounted the uprights or standards B and C, within which are fitted the bearings D and E respectively, which are preferably cylindrical in form and mounted in horizontal alignment with each other. Within the bearings D and E there are mounted respectively the slidable plungers F and G, having their adjacent ends formed with enlarged heads $f$ and $g$ respectively, each of which is provided with a concave spherical seat between which the inflated member is adapted to be positioned and deformed by compression.

The plunger F is designed to be moved toward the plunger G a predetermined distance, and this movement is accomplished through the medium of a pivoted lever H mounted adjacent one end of the bearing D, the operative end of the lever being formed with a cam surface $h$ adapted to engage a roller bearing $f'$ mounted in one end of the plunger F to move the same against the action of the coil spring $f^2$ which is positioned within a slot $f^3$ in the plunger F between the roller and an abutment J which is mounted in the standard B and extends through said slot $f^3$. To limit the throw of the cam $h$, the cam head of the lever H is fitted with a pin $h'$ adapted to engage a groove $d$ in the underside of the bearing D.

Movement of the plunger G within the bearing E, when pressure is exerted against the head $g$, is resisted by a helical spring K, the tension of which is adapted to be regulated by the adjusting nut L threaded on the rear end $g'$ of the plunger and a locking screw M fitting within the nut L and engaging the end $g'$. Rotation of the plunger is prevented by the screw $e$ engaging within the slot $g^2$ formed in the plunger. The extent of movement of the plunger G against the tension of the spring K, it will be apparent, will be proportional to the pressure exerted against the head $g$, and in order to indicate or measure this pressure, any suitable gauge means may be employed. As herein shown, I have mounted a gauge N upon the standard C, said gauge comprising a pinion $n$ and a pivotal sector $n'$, movement of which is controlled by the rigid arms O and P mounted on the plunger E.

In the operation of the device, the parts normally assume the position as shown in Fig. 2, and the lever H the position shown in dotted lines in Fig. 1. The inflated member, such as a squash ball or the like, the pressure of which is to be tested, is positioned between the concave faces of the enlarged heads $f$ and $g$, and the lever H is then moved to its horizontal position shown in Fig. 1, during which movement the cam $h$, acting through the roller $f$, moves the plunger F a predetermined distance toward the plunger G to deform the ball by compression. As this compression action takes place, the compression force is transmitted through the compressible fluid and the walls of the inflated member to the plunger G. The difference in the degree of movement between seat $f$ which is constant and the seat $g$ which is variable determines the pressure within the ball and is recorded by the gauge N, it being understood that the degree of movement of the plunger G and the divisions on the gauge dial are wholly arbitrary. As the lever H is raised, the plunger F is moved back to its normal position by the expansive action of the ball and the action of the spring $f^2$, while the plunger G is moved to its normal position by the spring K.

The invention as herein disclosed, while primarily designed to measure the pressure within squash balls or the like, it will be obvious that the same principle and apparatus may be employed to measure the pressure within any inflated body, and I therefore do not wish to be limited to the specific use of the invention as herein described. Nor do I wish to be limited to the precise construction herein disclosed, since it will be apparent that modifications thereof may be resorted to without departing from the spirit of the invention.

What I claim is:

1. A device of the character described, having means for deforming by compression an inflated member, comprising a plunger which is movable a predetermined distance in the direction of compression of the member, spring-pressed means exterior of the member adapted to aid the compressing action and to be moved because thereof, and a gauge operable by the movement of said spring-pressed means for indicating the pressure within the member.

2. A device of the character described, comprising a pair of spaced seats adapted to receive therebetween an elastic compressible member, means for moving the first seat a predetermined distance toward the second seat to compress a member when positioned between the seats, spring means resisting movement of the second seat, and means for indicating movement of the second seat.

3. A device of the character described, comprising a pair of spaced seats adapted to receive therebtween an elastic compressible member, a cam operated plunger for moving the first seat a predetermined distance toward the second seat to compress a member when positioned between the seats, a spring pressed plunger resisting movement of the second seat, and means for indicating movement of the second seat.

4. A device of the character described, comprising a pair of aligned spaced seats adapted to receive therebetween an elastic compressible member, means for moving the first seat a predetermined distance toward the second seat to compress a member when positioned between the seats, a spring pressed plunger resisting movement of the second seat, and means connecting the spring pressed plunger with a gauge mechanism for indicating movement of the second seat.

5. A device of the character described, comprising a pair of spaced movable seats adapted to receive therebetween an inflated member, means for moving one of said seats a predetermined distance toward the other seat to deform an inflated member when positioned between the seats, means resisting movement of the second seat when an inflated member is pressed thereagainst, and a gauge operable by movement of the second seat, adapted to indicate the pressure within the inflated member by the extent of its deformation.

In witness whereof, I have hereunto signed my name.

PHILIP GILLETT COLE.